United States Patent
Gao et al.

(10) Patent No.: US 12,277,341 B2
(45) Date of Patent: Apr. 15, 2025

(54) SOFTWARE-HARDWARE COMBINATION METHOD FOR INTERNAL MAPPING ADDRESS QUERY OF ZONED NAMESPACE

(71) Applicant: T-Head (Shanghai) Semiconductor Co., Ltd., Shanghai Free Trade Area (CN)

(72) Inventors: Xiang Gao, Shanghai (CN); Fei Xue, Sunnyvale, CA (US); Jiajing Jin, Hangzhou (CN); Wentao Wu, Shanghai (CN); Jiu Heng, Chengdu (CN); Yuming Xu, Chengdu (CN); Jifeng Wang, Chengdu (CN)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 119 days.

(21) Appl. No.: 18/172,761

(22) Filed: Feb. 22, 2023

(65) Prior Publication Data
US 2024/0143219 A1   May 2, 2024

(30) Foreign Application Priority Data
Nov. 2, 2022 (CN) .......................... 202211363339.9

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/061; G06F 3/064; G06F 3/0659
See application file for complete search history.

(56) References Cited

U.S. PATENT DOCUMENTS

| | | | |
|---|---|---|---|
| 7,454,759 B2 | 11/2008 | Mukundan et al. | |
| 8,136,150 B2 | 3/2012 | Hayler et al. | |
| 8,146,097 B2 | 3/2012 | Mukundan et al. | |
| 8,543,665 B2 | 9/2013 | Ansari et al. | |
| 8,706,954 B2 * | 4/2014 | Aoyagi ................. | G11C 29/82 711/E12.008 |
| 9,143,839 B2 | 9/2015 | Reisman | |
| 9,191,380 B2 | 11/2015 | Anderson et al. | |
| 9,262,245 B2 | 2/2016 | Coker et al. | |

(Continued)

*Primary Examiner* — Sean D Rossiter
(74) *Attorney, Agent, or Firm* — Sheppard Mullin Richter & Hampton LLP (57) ABSTRACT

This application describes systems and methods for facilitating memory access on flash drives. An example method may start with receiving a read command on a flash memory from a host specifying a logic block address (LBA). The flash memory may include a plurality of blocks grouped into a plurality of super blocks, and each of the plurality of blocks may include a plurality of pages. The method may further include determining a zone identification and an LBA offset based on the LBA; determining a flash physical address (FPA) corresponding to the LBA by accessing a mapping table stored in a random access memory (RAM) according to the zone identification and the LBA offset (e.g., the mapping table includes a plurality of FPAs arranged in a plurality of zones corresponding to the plurality of super blocks); and determining a page number and a block identification corresponding to the FPA.

18 Claims, 7 Drawing Sheets

(56) References Cited

U.S. PATENT DOCUMENTS

| | | | |
|---|---|---|---|
| 9,374,395 B2 | 6/2016 | Barton et al. | |
| 9,461,961 B2 | 10/2016 | Neerdaels | |
| 9,772,938 B2 | 9/2017 | Talagala et al. | |
| 10,346,048 B2* | 7/2019 | Devendrappa | G06F 3/0616 |
| 10,769,633 B2 | 9/2020 | Dua | |
| 10,791,050 B2 | 9/2020 | Varney et al. | |
| 10,817,502 B2 | 10/2020 | Talagala et al. | |
| 10,996,863 B1 | 5/2021 | Kuzmin et al. | |
| 11,226,903 B1 | 1/2022 | Lercari et al. | |
| 2008/0285347 A1* | 11/2008 | Byeon | G11C 29/76 365/185.09 |
| 2014/0098660 A1* | 4/2014 | Viorel | H04W 74/0833 370/229 |
| 2018/0246670 A1 | 8/2018 | Baptist et al. | |
| 2018/0337885 A1 | 11/2018 | Singh et al. | |
| 2019/0065387 A1* | 2/2019 | Duzly | G06F 12/0246 |
| 2019/0104035 A1 | 4/2019 | Cidon et al. | |
| 2019/0108558 A1 | 4/2019 | Spivack et al. | |
| 2020/0167274 A1 | 5/2020 | Bahirat et al. | |
| 2020/0241799 A1* | 7/2020 | Kanno | G06F 3/064 |
| 2021/0056023 A1* | 2/2021 | Jin | G06F 3/0679 |
| 2021/0072893 A1 | 3/2021 | Singh et al. | |
| 2021/0160318 A1 | 5/2021 | Sajeepa et al. | |
| 2021/0182166 A1 | 6/2021 | Hahn et al. | |
| 2021/0234728 A1 | 7/2021 | Cidon et al. | |
| 2021/0406174 A1* | 12/2021 | Gole | G06F 12/0246 |
| 2022/0019377 A1* | 1/2022 | Jain | G06F 12/10 |
| 2022/0027051 A1 | 1/2022 | Kant et al. | |
| 2022/0066685 A1* | 3/2022 | Hong | G06F 3/0655 |
| 2023/0075437 A1* | 3/2023 | Xu | G06F 12/0866 |
| 2023/0297262 A1* | 9/2023 | Sasaki | G06F 3/0679 711/154 |
| 2023/0367500 A1* | 11/2023 | Kragel | G06F 3/061 |
| 2024/0152449 A1* | 5/2024 | Wei | G06F 12/023 |

* cited by examiner

SOFTWARE-HARDWARE COMBINATION METHOD FOR INTERNAL MAPPING ADDRESS QUERY OF ZONED NAMESPACE

CROSS REFERENCE TO RELATED APPLICATION

This application claims priority to and benefits of Chinese patent Application No. 202211363339.9, filed with the China National Intellectual Property Administration (CNIPA) on Nov. 2, 2022. The entire contents of the above-identified application are incorporated herein by reference.

TECHNICAL FIELD

The disclosure relates generally to data accessing on flash memories.

BACKGROUND

Memory access on flash memories can include reading operations and writing operations. While writing operations is typically executed in a serial manner, reading operations often involves random access on the flash memories, and physical locations corresponding to logical address on the flash memory needs to be calculated using valuable hardware processing resources. Such calculations can become especially tedious when bad blocks start to accumulate in the flash memories, which causes complications in the calculations. There is a need to reduce this significant bottleneck in executing reading operations on flash drives such as solid-state drives (SSDs).

SUMMARY

Various embodiments of the present specification may include hardware circuits, systems, methods for efficient memory allocation for sparse matrix multiplications.

According to one aspect, a system comprises a host, a memory controller communicatively coupled with the host, and a flash memory communicatively coupled to the memory controller, the flash memory comprises a plurality of blocks grouped into a plurality of super blocks, and each of the plurality of blocks including a plurality of pages, wherein the memory controller comprises: a flash translation layer configured to: receive a read command on the flash memory from the host, wherein the read command comprises a logic block address (LBA), and determine, based on the LBA, a zone identification and an LBA offset; a random access memory (RAM) configured to store a mapping table, wherein the mapping table includes a plurality of flash physical addresses (FPAs) arranged in a plurality of zones corresponding to the plurality of super blocks; and an address management circuitry configured to: receive the zone identification and the LBA offset from the flash translation layer, determine an FPA corresponding to the LBA by accessing the mapping table stored in the RAM according to the zone identification and the LBA offset, and determine a page number and a block identification corresponding to the FPA, the page number and the block identification are used to execute the read command by accessing data stored at a page from the plurality of pages corresponding to the page number in a block from the plurality of blocks corresponding to the block identification.

In some embodiments, the address management circuitry is implemented on a field programmable gate array (FPGA) or an application-specific integrated circuit (ASIC).

In some embodiments, the flash memory includes solid state drives (SSDs).

In some embodiments, the mapping table is generated and stored in the RAM in response to the flash memory being powered up.

In some embodiments, the mapping table is generated by skipping one or more bad blocks in the plurality of super blocks.

In some embodiments, the RAM is one or more double data rate (DDR) synchronous dynamic random access memory (SDRAM).

In some embodiments, the address management circuitry is further configured to determine, in parallel, a plurality of FPAs corresponding to a plurality of LBA offsets.

In some embodiments, the memory controller is an open-channel controller for the flash memory.

According to another aspect, a method comprises includes receiving, by a flash translation layer in a memory controller, a read command on a flash memory from a host, wherein the read command comprises a logic block address (LBA), the flash memory comprises a plurality of blocks grouped into a plurality of super blocks, and each of the plurality of blocks includes a plurality of pages; determining, by the flash translation layer, a zone identification and an LBA offset based on the LBA; determining, by an address management circuitry, a flash physical address (FPA) corresponding to the LBA by accessing a mapping table stored in a random access memory (RAM) according to the zone identification and the LBA offset, wherein the mapping table includes a plurality of FPAs arranged in a plurality of zones corresponding to the plurality of super blocks; and determining, by the address management circuitry, a page number and a block identification corresponding to the FPA, wherein the page number and the block identification are used to execute the read command by accessing data stored at a page from the plurality of pages corresponding to the page number in a block from the plurality of blocks corresponding to the block identification.

According to another aspect, non-transitory computer-readable storage media store instructions that, when executed by one or more processors, cause the one or more processors to perform operations comprising: receiving, by a flash translation layer in a memory controller, a read command on a flash memory from a host, wherein the read command comprises a logic block address (LBA), the flash memory comprises a plurality of blocks grouped into a plurality of super blocks, and each of the plurality of blocks includes a plurality of pages; determining, by the flash translation layer, a zone identification and an LBA offset based on the LBA; determining, by an address management circuitry, a flash physical address (FPA) corresponding to the LBA by accessing a mapping table stored in a random access memory (RAM) according to the zone identification and the LBA offset, wherein the mapping table includes a plurality of FPAs arranged in a plurality of zones corresponding to the plurality of super blocks; and determining, by the address management circuitry, a page number and a block identification corresponding to the FPA, wherein the page number and the block identification are used to execute the read command by accessing data stored at a page from the plurality of pages corresponding to the page number in a block from the plurality of blocks corresponding to the block identification.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

NAND flash is a type of non-volatile memory using floating-gate transistors. In NAND flash, data can be stored in bits, where typically one cell can store one bit. These cells can be grouped into bit lines of the NAND flash. A plurality of bit lines can then be grouped into pages, and a plurality of pages can be grouped to form a block. A NAND flash can comprise a plurality of blocks, and an exact number of blocks in a NAND flash can depend on a specification of the NAND flash. For write operations, NAND flash can write using a page as a unit. For erase operations, NAND flash erases one block at a time. The number of erase operations that can be performed on a block is finite. The maximum number of erases that is allowed on a block can be referred to as program erase cycles.

A super block is a logical block formed by a plurality of blocks in NAND flash. In a super block, write operations and erase operations can be performed on all blocks at once. In other words, the life cycles of data can be mostly consistent in all blocks of a super block.

A super page is a logical page formed by the same pages in all blocks of a super block. For example, the first page of each block in a super block can be grouped to form a super page.

A bad block is a block in NAND flash that has undergone too many erase operations, so that the block is no longer functional.

A logical block address (LBA) is a common scheme for specifying locations of data at an application level or a host level. LBAs are visible to applications or hosts, and to access data pointed to by the LBAs in flash drives, the LBAs need to be translated into physical addresses in the flash drives. When a host stores data at a specific LBA, such as LBA 0, and later rewrites into the same LBA 0, the new data may be stored in a different physical address in the flash drives, but a mapping table of the NAND flash can be modified, so that the LBA 0 now points to the new physical address storing the new data. The new data is still written into the NAND memory in a serial manner.

A solid-state drive (SSD) is a memory drive that can use NAND flash to store data persistently. An SSD controller can be an embedded processor on the SSD, and the SSD controller can be configured to execute firmware-level software for the SSD and accelerate data access and processing on the SSD.

A Synchronous Dynamic Random-Access Memory (SDRAM) is a type of dynamic random access memory (DRAM) that provides faster data accessing.

A flash translation layer (FTL) is an intermediate layer configured to manage SSD operations. The FTL can comprise hardware, software, or both, and the FTL can be configured to perform logical-to-physical addresses translation, garbage collection, wear-leveling, error correction code (ECC), bad block management, etc.

A flash physical address (FPA) refers to a physical address on the NAND flash. For example, an FPA can include a block number, a channel number, a page number, etc. for a specific physical address on the NAND flash.

Zoned namespaces is a part of command set for managing SSD resources. The zoned namespaces can provide a host to a zoned block storage interface, and divide the interface into a plurality of zones. Each zone allows random read operations and serial write operations. As a result, data storage inside the SSD can be simplified, allowing the written data to be aligned with the physical storage media to enhance SSD's overall throughput, storage, life cycle, etc. SSDs that supported zoned namespaces are also referred to as zoned namespaces SSD (ZNS SSD). Each zone in the zoned namespaces can cover a large storage in an SSD (e.g., 16 gigabytes of storage). Since data in each zone can be recycled (e.g., through garbage collection) together, the life cycle of data prior to being recycled or erased can be enlarged significantly. For example, if a zone covers 16 gigabytes of data, the 16 gigabytes of data can be recycled together, rather than an amount of data covered by one LBA (e.g., a few megabytes). Overall, there can be less number of erasing operations performed on the SSD, leading to a prolonged life cycle of the SSD.

Figure 1:
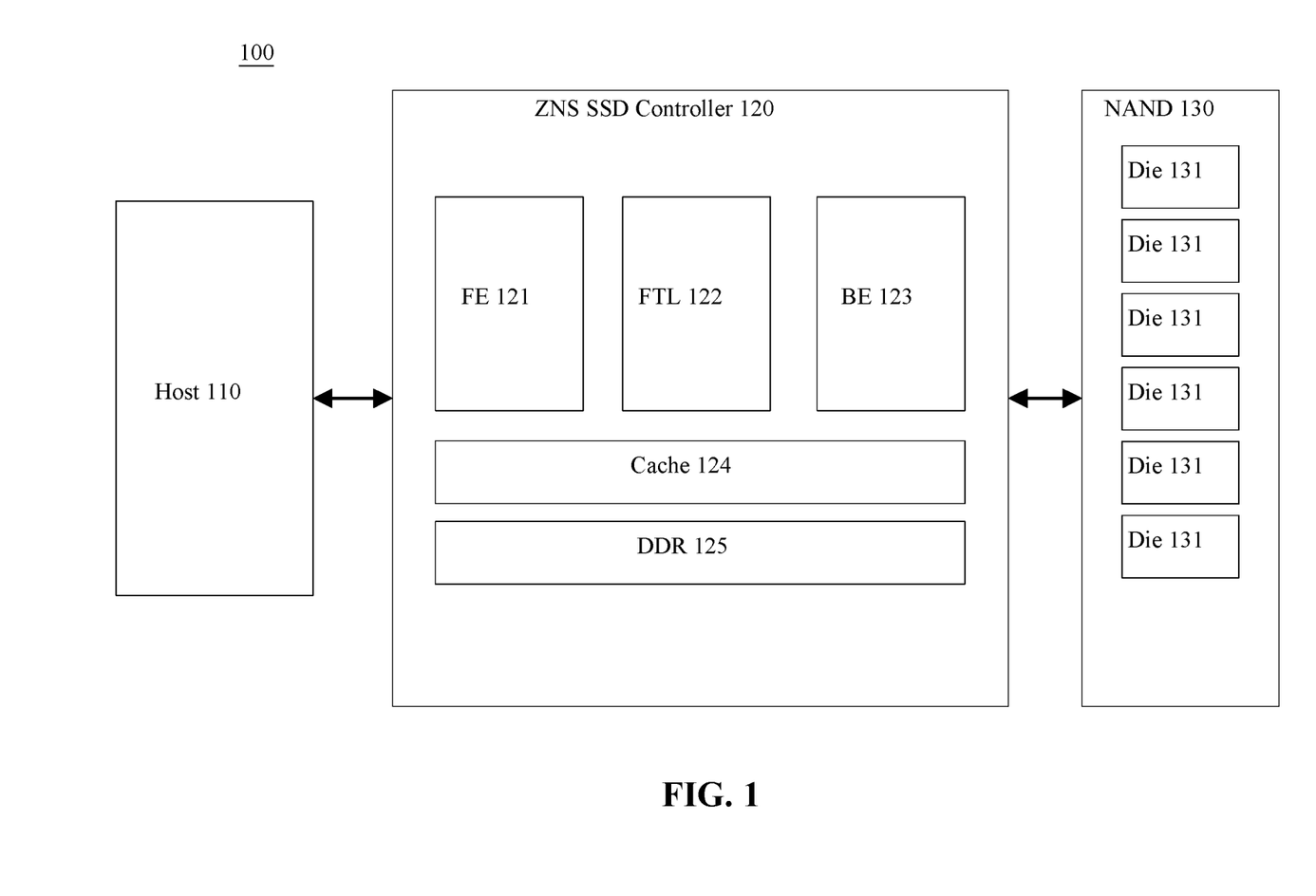
FIG. 1 is a schematic of an example architecture of a flash drive memory system with zoned namespaces, according to some embodiments of this specification.

FIG. 1 is a schematic of an example architecture of a flash drive memory system with zoned namespaces, according to some embodiments of this specification. As shown in FIG. 1, a flash drive memory system 100 comprises a host 110, an SSD controller 120, and NAND 130. The schematic in FIG. 1 is for illustrative purposes only, and flash drive memory system 100 shown in FIG. 1 may have fewer, more, and alternative components and connections depending on the implementation.

As shown in FIG. 1, SSD controller 120 can be communicatively coupled with host 110 and NAND flash 130. In some embodiments, host 110 is configured to interact with SSD controller 120 via a zoned block storage interface, which can be divided into a plurality of zones. Each zone allows random read operations and serial write operations. In some embodiments, NAND flash 130 comprises one or more dies 131. Each of dies 131 can be configured to store data. In some embodiments, NAND flash 130 can have a large storage capacity (e.g., 30 TB) that is managed and accessed by one SSD controller 120.

In some embodiments, SSD controller 120 comprises a frontend 121, an FTL 122, and a backend 123.

In some embodiments, frontend 121 is configured to receive memory access commands from host 110, and decode the memory access commands according to one or more memory protocols. The memory access commands can include read operations, write operations, erase operations, garbage collection operations, etc. The decoding can include translating the memory access commands for FTL 122 to process and breaking down the memory access commands into a set of commands for FTL 122 to process.

In some embodiments, FTL 122 is configured to receive the decoded memory access command from frontend 121, perform logical-to-physical addresses translation, garbage collection, wear-leveling, error correction code (ECC), bad block management, etc., and send a physical memory access information to backend 123.

In some embodiments, backend 123 is configured to perform condition management for flash drive memory system 100, issue decoding commands, receive the physical memory access information from FTL 122, perform memory access on NAND 130 according to the physical memory access information, etc.

In some embodiments, SSD controller 120 further comprises a cache 124 or double data rate (DDR) synchronous dynamic random access memory (SDRAM) 125, which can be configured to facilitate executions of the memory access commands on NAND 130. In some embodiments, SSD controller 120 is an open-channel controller for NAND 130.

Figure 2:
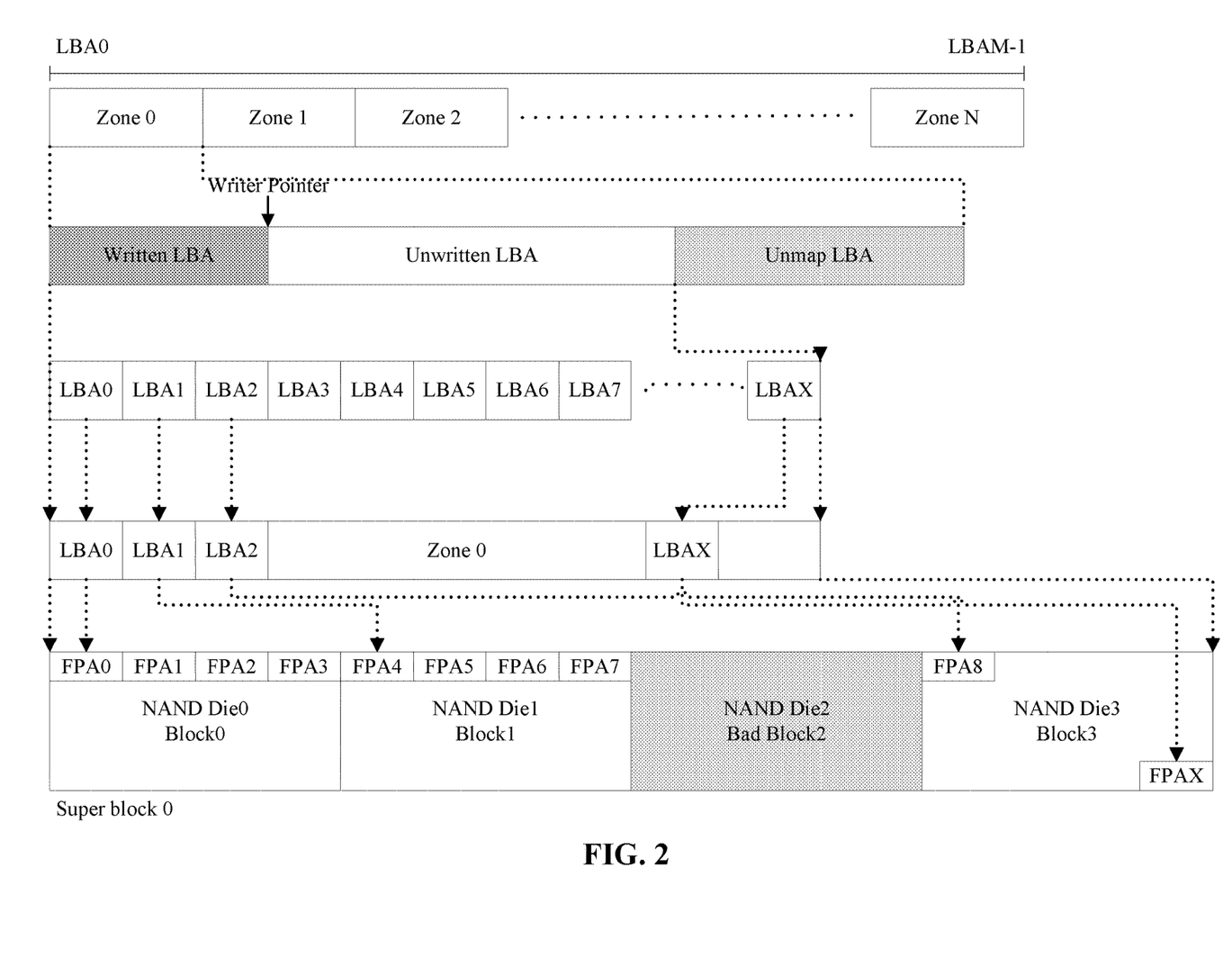
FIG. 2 is a schematic of an example workflow of a flash drive with zoned namespaces, according to some embodiments of this specification.

FIG. 2 is a schematic of an example workflow of a flash drive with zoned namespaces, according to some embodiments of this specification. It is appreciated that the workflow shown in FIG. 2 can be conducted by flash drive memory system 100 shown in FIG. 1. As shown in FIG. 2, the workflow in FIG. 2 is for illustrative purposes only, and the workflow shown in FIG. 2 may have fewer, more, and alternative steps, components and connections depending on the implementation.

As shown in FIG. 2, in an SSD with zoned namespaces, each zone may support random reading operations and only serial writing operations. An erasing operation can be performed on one zone as a unit, and the erasing operation can be referred to as a reset on the zone. An order of LBAs in write operations from a host can be in a same order as it is written in each zone. Moreover, one zone can be mapped to one super block. As a result, LBAs from a host (e.g., host 110 of FIG. 1) can be serially mapped into one or more zones, and there may not be a need for an extra mapping table that tracks mappings between LBAs and physical addresses inside the zones. Therefore, there may not be a need for a dedicated memory storing the mapping table (e.g., inside SSD controller 120). For example, as shown in FIG. 2, LBA0 to LBAM-1 can be serially mapped between zone 0 and zone N. Each zone can include a written portion, an unwritten portion, and an unmap portion, and a writer pointer can be provided to indicate a location of the written portion. For example, as shown in FIG. 2, zone 0 can include a written LBA portion, an unwritten LBA portion, and an unmap LBA portion. A writer pointer points to a location where the written LBA portion ends and the unwritten LBA portion starts. The unmap LBA portion can be created or indicated when, for example, the system (e.g., from the host) requests a memory block that is smaller than the size of a zone. For example, when each zone captures 16 gigabytes of physical storage, and the system only requests 10 gigabytes of memory, one zone of physical storage is still supplied to the system, but 6 gigabytes of the memory in the zone can be in the unmap LBA portion.

As shown in FIG. 2, LBA0 to LBAM-1 is mapped to zone 0 to zone N. Each zone, such as zone 0, can map X+1 LBAs. Since the mapping is serial, the first X+1 LBAs are mapped to LBA0 to LBAX of zone 0, the second X+1 LBAs are mapped to LBA0 to LBAX of zone 1, etc.

When a storage space of a zone is mapped onto flash physical addresses (FPAs), one or more factors can play a role. For example, the one or more factors can include a determination of whether a super block has a bad block, a determination of which blocks have been used in a super block, and a determination of how data is arranged on a super block. For example, as shown in FIG. 2, FPAs are arranged in a serial manner in super block 0. Each LBA can map to four FPAs (e.g., for reading operations). For example, LBA0 maps to FPA0, FPA1, FPA2, and FPA3, which are in a first row in block0 (or NAND die 0). Then, in a serial manner, LBA1 maps to FPA4, FPA 5, FPA 6, and FPA 7, which are in a first row in block1 (or NAND die 1). Since the next block is a bad block, the next LBA (i.e. LBA2) that is mapped to FPA 8 is located in block3 (or NAND die 3).

Due to the existence of the one or more factors described above, when an LBA address (e.g., LBA X shown in FIG. 2) is sent from the host, there may not be a readily available mapping table (e.g., logical-to-physical mapping table or L2P mapping table) from which a physical location corresponding to the LBA address can be easily identified. As a result, the FPAs may need to be calculated or determined using hardware resources, such as CPUs on the SSD controller. The calculation or determination can include the following steps. First, based on a determination of how data is arranged on the super block, an initial physical can be determined from the LBA X. Second, based on the determined initial physical location, a block number corresponding to the LBA X can be determined. Third, based on the determined block number, it is determined whether the block corresponding to the block number is a bad block. If the block is a bad block, the bad block needs to be skipped, and the steps described above can be repeated until a non-bad block is found.

Executing the steps described above can take up significant hardware processing resources, especially when the steps are executed repeatedly each time a memory access operation is executed. Moreover, processors such as CPUs tend to execute the steps in a serial manner, further exacerbating the inefficiency in determining FPAs from LBAs. This inefficiency can become a significant bottleneck for executing reading operations on flash drives such as SSDs.

Figure 3:
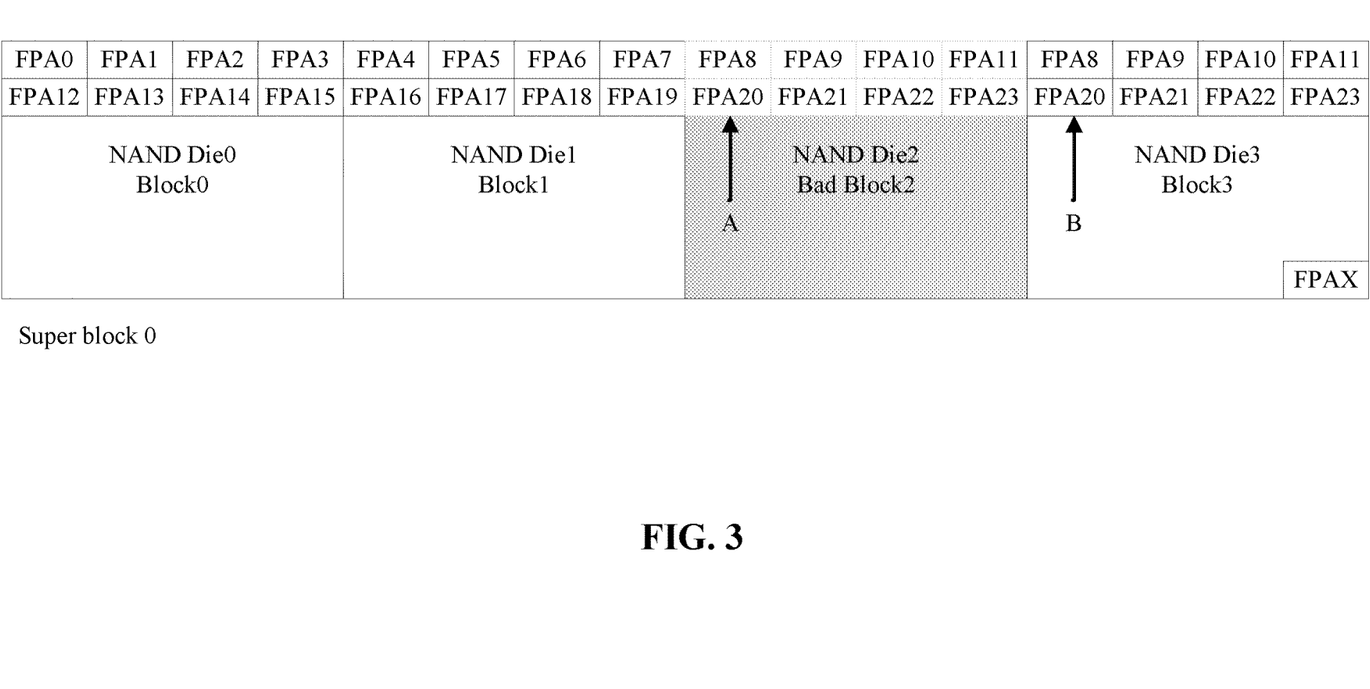
FIG. 3 is a schematic of an example physical address arrangement for a flash drive with zoned namespaces, according to some embodiments of this specification.

Embodiments of this specification provide systems and methods for improved FPA lookups using hardware memories. FIG. 3 is a schematic of an example physical address arrangement for a flash drive with zoned namespaces, according to some embodiments of this specification. As shown in FIG. 3, the arrangement in FIG. 3 is for illustrative purposes only, and the arrangement shown in FIG. 3 may have fewer, more, and alternative steps, components and connections depending on the implementation.

As shown in FIG. 3, super block 0 includes a number of blocks, such as block0, block1, bad block2, and block3. FPAs are arranged serially in super block 0, across different blocks. For example, FPA0, FPA1, FPA2, and FPA3 are in block0, FPA4, FPA5, FPA6, and FPA7 are in block3, etc. Each line of FPAs in a block can be referred to as a page. For example, FPA0, FPA1, FPA2, and FPA3 can form a page in block0. Multiple pages along the same line in a super block can form a super page. For example, FPA0 to FPA11 can form a super page in super block 0. In a case of a bad block (e.g., bad block2), the bad block is skipped, and FPAs are shifted to a next good block. A bad block can also affect a size of a super page. For example, as shown in FIG. 3, due to the existence of bad block2, the size of a super page is reduced to 12 FPAs as opposed to 16 FPAs.

Figure 4:
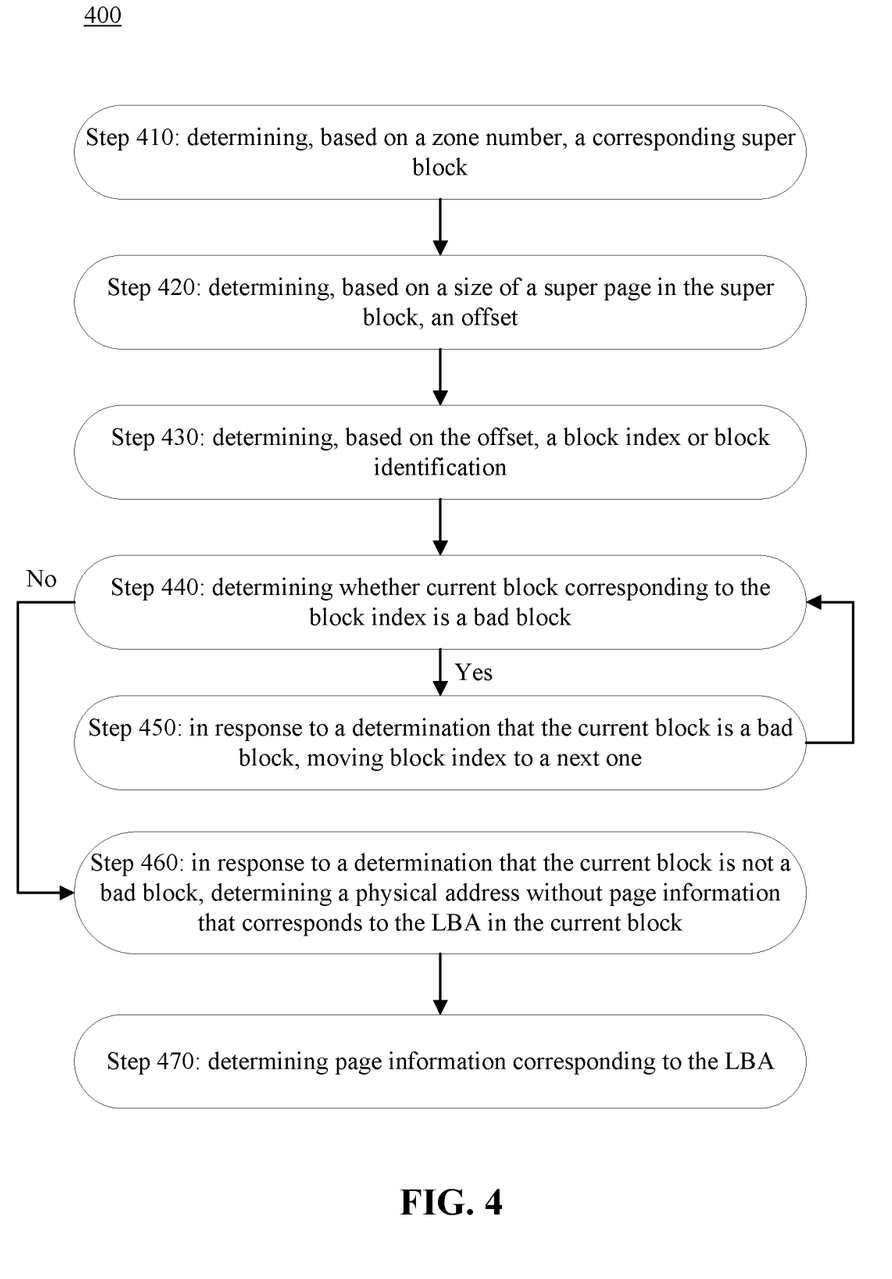
FIG. 4 is a flowchart of an example method in performing address translations using hardware memories, according to some embodiments of this specification.

FIG. 4 is a flowchart of an example method in performing address translations using hardware memories, according to some embodiments of this specification. It is appreciated that method 400 shown in FIG. 4 can be performed by flash drive memory 100 shown in FIG. 1. As shown in FIG. 4, method 400 in FIG. 4 is for illustrative purposes only, and method 400 shown in FIG. 4 may have fewer, more, and alternative steps, components and connections depending on the implementation.

Step 410 includes determining, based on a zone number, a corresponding super block. For example, if one zone is mapped to one super block, zone 0 can be mapped to super block 0 (e.g., as shown in FIG. 2), zone 1 can be mapped to super block 1, etc.

Step 420 includes determining, based on a size of a super page in the super block, an offset. For example, as shown in FIG. 3, the size of a super page in super block 0 is 12. As a result, for LBA20, an offset can be determined as 21%12, which is 9. In some embodiments, super pages in different super blocks can have different sizes. For example, as shown in FIG. 3, zone 0 has one bad block. As a result, the size of a super page in zone 0 is 12. Zone 1 may not have any bad blocks. As a result, the size of a super page in zone 1 is 16. Zone 2 may have two bad blocks. As a result, the size of a super page in zone 2 is 8. In some embodiments, information regarding bad blocks can be stored in a cache (e.g., cache 124 or SSD 125 of FIG. 1) of the SSD controller (e.g., SSD controller 120 of FIG. 1).

Step 430 includes determining, based on the offset, a block index or block identification. For example, as shown in FIG. 3, For LBA20, the offset is 9. Since a page in each block encompasses 4 FPAs, the block index for LBA20 is ceiling (9/4), which is 3.

Step 440 includes determining whether current block corresponding to the block index is a bad block. For example, as shown in FIG. 3, for LBA20, the block index is 3, which corresponds to bad block2. In some embodiments, information regarding bad blocks can be stored in a cache (e.g., cache 124 of FIG. 1) of the SSD controller (e.g., SSD controller 120 of FIG. 1). If it is determined that the block is a bad block, step 450 is performed. If it is determined that the block is not a bad block, step 460 is performed.

Step 450 includes in response to a determination that the current block is a bad block, moving block index to a next one, and steps 440 is repeated until a good block is found. For example, as shown in FIG. 3, FPA20 is determined to be located in bad block2, which is a bad block. As a result, the block index is moved to a next one, which corresponds to block3, a good block.

Step 460 includes in response to a determination that the current block is not a bad block, determining a physical address without page information that corresponds to the LBA in the current block. For example, as shown in FIG. 3, FPA20 can be determined to be a first FPA in a page in block3.

Step 470 includes determining page information corresponding to the LBA. For example, as shown in FIG. 3, a super page has 12 FPAs. Page information can be determined by calculating ceiling (21/12), which is 2. As a result, page information (page number) corresponding to the LBA is 1. Therefore, LBA20 translates to the first FPA in a second page in block3.

Figure 5:
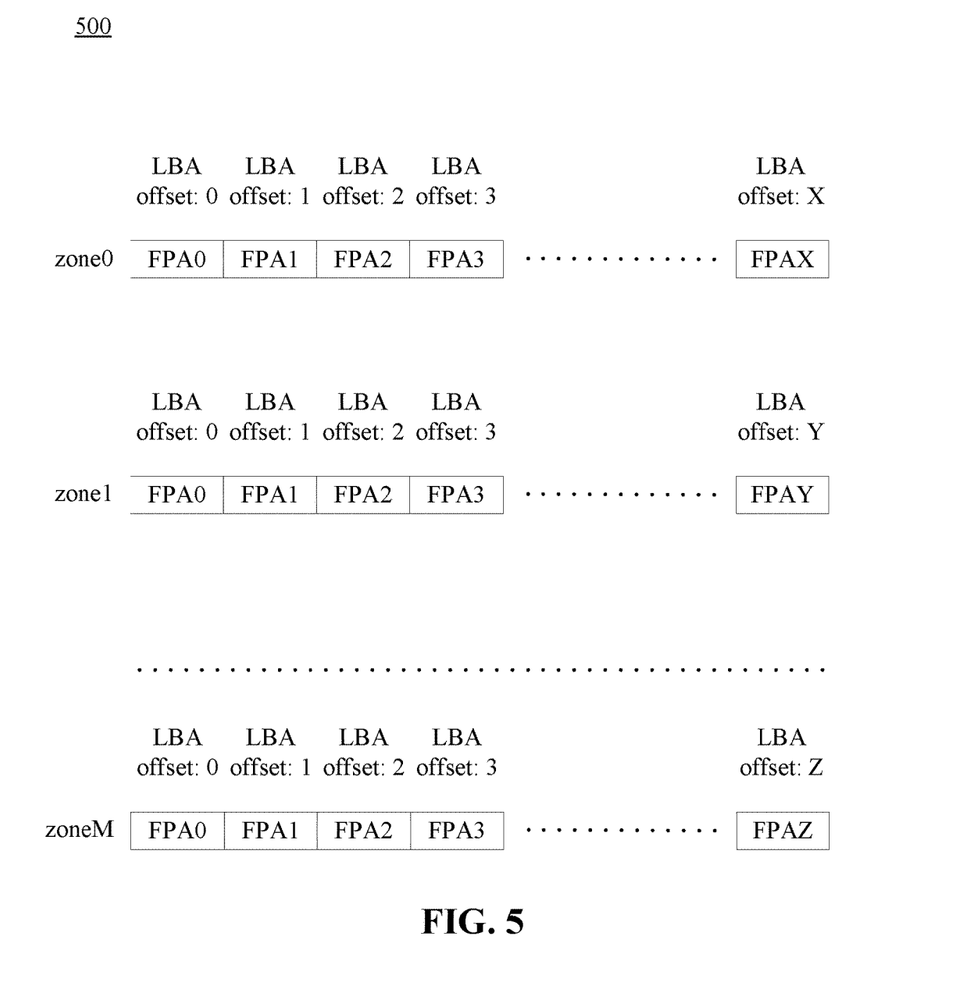
FIG. 5 is a schematic of an example mapping table stored in hardware memory, according to some embodiments of this specification.

FIG. 5 is a schematic of an example mapping table stored in hardware memory, according to some embodiments of this specification. FIG. 5 is for illustrative purposes only, and mapping table 500 shown in FIG. 5 may have fewer, more, and alternative components, arrangements and connections depending on the implementation.

As shown in FIG. 5, M number of zones are arranged in order. For example, zone0 is followed by zone1, which is followed by zone2, etc. Each of the zones can have a different size. For example, as shown in FIG. 5, zone0 has X number of FPAs, zone1 has Y number of FPAs, and zoneM has Z number of FPAs. The differences in size are due to the fact that super blocks corresponding to each of the zones can have a different number of bad blocks (e.g., super block 0 shown in FIG. 3 has one bad block). Mapping table 500 can be generated by an SSD controller and can be stored in a memory (e.g., DDR) in the SSD controller. For example, when the SSD is powered up, the SSD controller can determine where each FPA is located in each of the M number of zones (e.g., using method 400 shown in FIG. 4) by determining where the bad blocks are (e.g., using step 440 shown in FIG. 4), and generate mapping table 500 to be stored in a high speed memory (e.g., DDR) in the SSD controller. When the SSD controller executes random read operations on the SSD, the SSD controller can quickly look up the physical locations of each FPA in mapping table. For example, an entry in the mapping table can include information such as channel, die number, block number, plane number, page number, etc. Therefore, the SSD controller no longer needs to devote valuable computing resources (e.g., CPUs) to perform calculations in performing address translations for each LBA in the read operations. As a result, the overall efficiency for executing memory access operations can be significantly improved.

Figure 6:
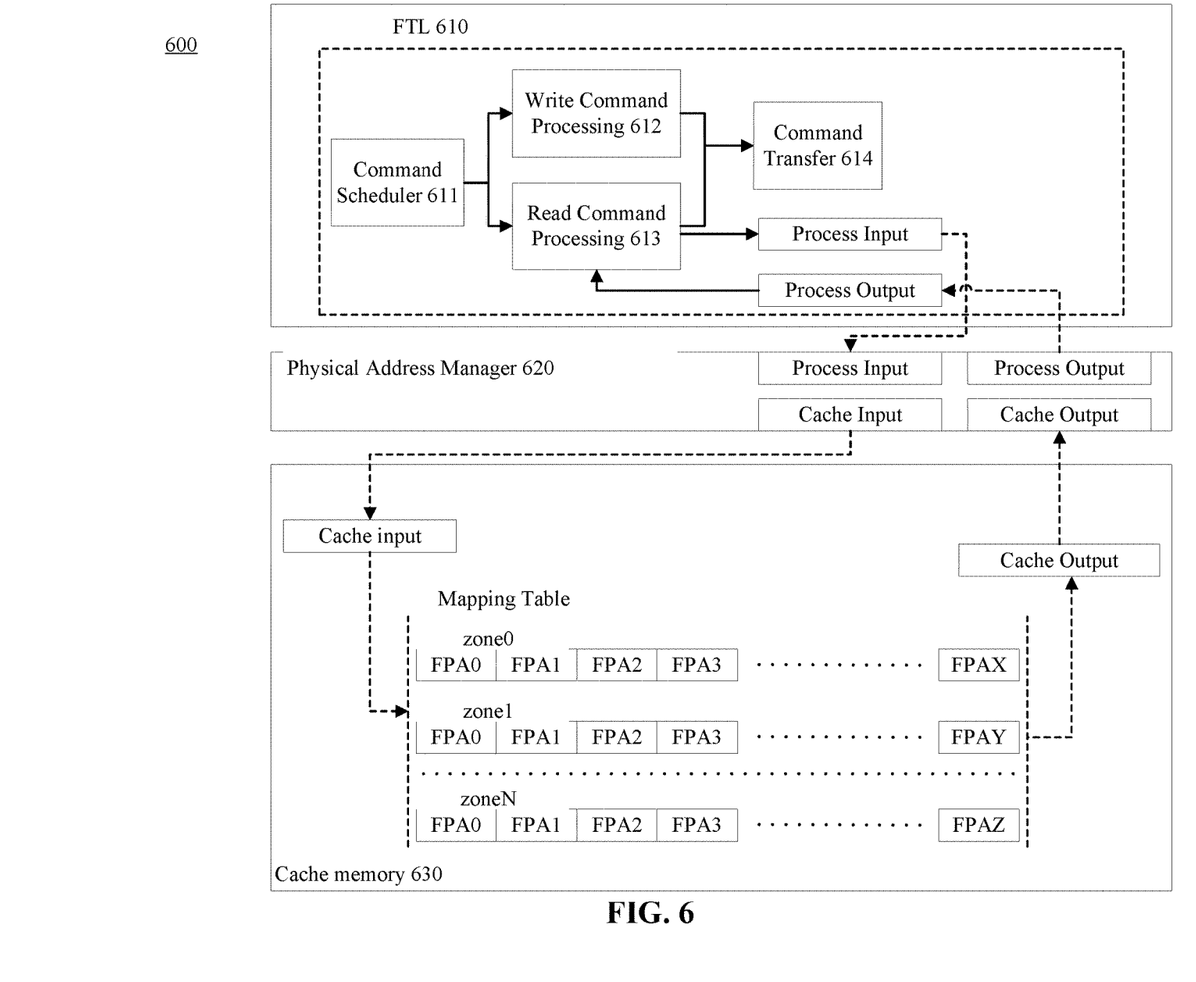
FIG. 6 is a schematic of an example architecture of an SSD controller with zoned namespaces and a cached mapping table, according to some embodiments of this specification.

FIG. 6 is a schematic of an example architecture of an SSD controller with zoned namespaces and a cached mapping table, according to some embodiments of this specification. It is appreciated that an SSD controller 600 shown in FIG. 6 can include components similar to SSD controller 120 shown in FIG. 1. For example, SSD controller 600 can also comprise a frontend (e.g., similar to frontend 121 of FIG. 1), an FTL 610 (similar to FTL 122 of FIG. 1), a backend (e.g., similar to backend 123 of FIG. 1), and a cache memory 630 (e.g., similar to cache 124 or DDR 125 of FIG. 1). In addition, SSD controller 600 can further comprise a physical address manager 620. The schematic in FIG. 6 is for illustrative purposes only, and SSD controller 600 shown in FIG. 6 may have fewer, more, and alternative components and connections depending on the implementation.

As shown in FIG. 6, physical address manager 620 is communicatively coupled with FTL 610 and cache memory 630. When a memory access command including an LBA is received by FTL 610 from a host (e.g., host 110 of FIG. 1), a command scheduler 611 determines whether the memory access command is a read command or a write command. Based on the determination, command scheduler 610 sends read commands to read command processing 613 and write commands to write command processing 612. Since read commands involve random access on the NAND flash (e.g., NAND 130 of FIG. 1), FTL 610 needs additional resources (e.g., physical address manager 620 and cache memory 630) to look up physical locations for the LBA. As a result, read command processing 613 sends process input including the LBA to physical address manager 620.

Physical address manager 620 receives the process input and the LBA, and looks up an FPA corresponding to the LBA in a mapping table (e.g., mapping table 500 shown in FIG. 5) stored in cache memory 630. In some embodiments, the mapping is a linear mapping to FPA. As a result, the look up process can be easily performed. For example, FPA can be look up using LBA as an array index (e.g., by performing one or more division calculations). In some embodiments, physical address manager 620 is configured to process a plurality of LBAs in parallel, further improving the efficiency of SSD controller 600 in executing data processing commands. For example, there can be for calculator or locate engine to process more than one request at a time. In some embodiments, physical address manager 620 can be implemented on an application-specific integrated circuit (ASIC) or a field programmable gate arrays (FPGA).

Cache memory 630 stores the mapping table, and returns FPA information corresponding to the LBA from the mapping table to physical address manager 620 based on cache input from physical address manager 620. Physical address manager receives the FPA information from cache memory 630 via cache output, and sends the FPA information to FTL 610 via process output. Read command processing 613 receives the FPA information, and sends the read command together with the FPA information to command transfer 614. Command transfer 614 can send the FPA information to a backend (e.g., backend 123 of FIG. 1), which performs data accessing on NAND flash (e.g., NAND 130 of FIG. 1).

Figure 7:
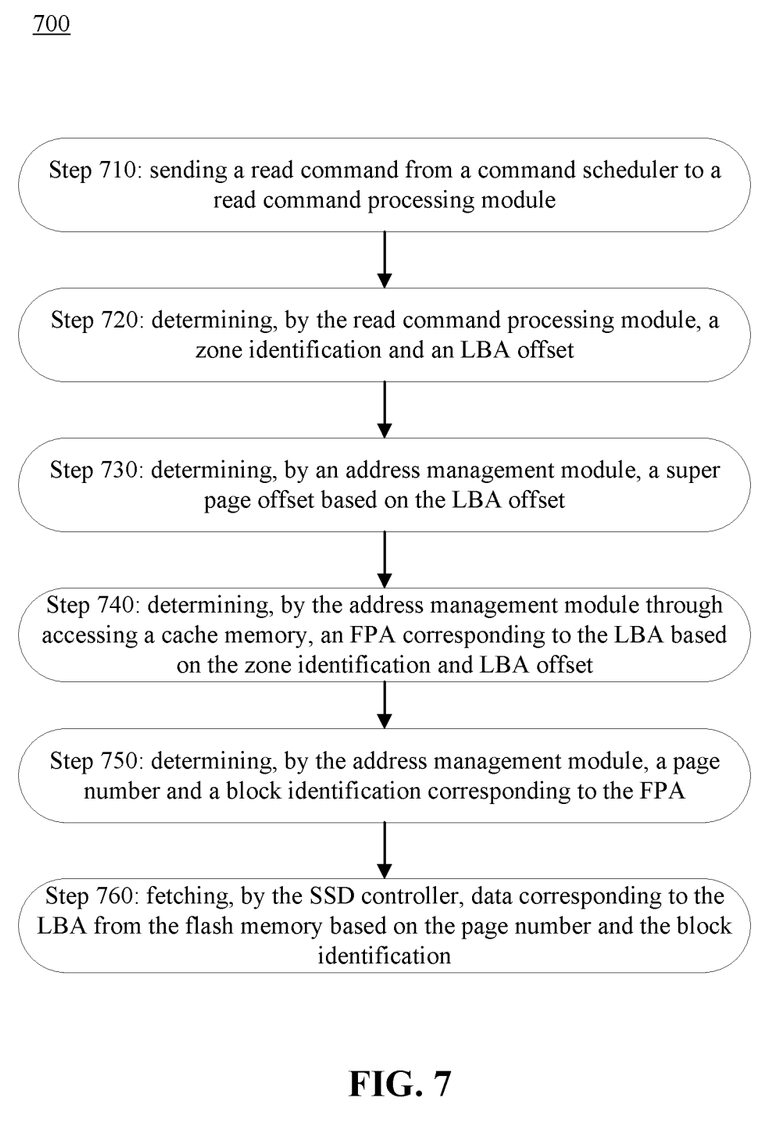
FIG. 7 is a flowchart of an example method in performing address translations using physical address managers and hardware memories, according to some embodiments of this specification.

FIG. 7 is a flowchart of an example method in performing address translations using physical address managers and hardware memories, according to some embodiments of this specification. It is appreciated that method 700 shown in FIG. 7 can be performed by system 600 shown in FIG. 6. FIG. 7 is for illustrative purposes only, and method 700 shown in FIG. 7 may have fewer, more, and alternative steps, components and connections depending on the implementation.

Step 710 includes sending a read command from a command scheduler to a read command processing module. In some embodiments, the command scheduler is similar to command scheduler 611 shown in FIG. 6, and the read command processing module is similar to read command processing 613 shown in FIG. 6. In some embodiments, the command scheduler and the read command processing module are parts of a memory controller (e.g., SSD controller 120 of FIG. 1). In some embodiments, the read command comprises an LBA. In some embodiments, the read command is for reading data from a flash memory (e.g., NAND 130 of FIG. 1).

Step 720 includes determining, by the read command processing module, a zone identification and an LBA offset. For example, as shown in FIG. 5, FPAs are arranged in order across different zones. Each of the zones can have different sizes. As a result, the read command processing module can process the LBA and find out in which zone the corresponding FPA falls into, and the LBA offset in that specific zone.

Step 730 includes determining, by an address management module, a super page offset based on the LBA offset. In some embodiments, the super page offset can be used to determine an array index. For example, an LBA-offset mapping may only store one super page, and one super block can store a plurality of super pages (e.g., 1,000 super pages). The plurality of super pages can follow the same mapping scheme, with different page addresses. As a result, the array index can be determined by dividing the super page offset with LBA. In some embodiments, the address management module can be similar to physical address manager shown in FIG. 6. As shown in FIG. 3, each zone or the corresponding super block can have different numbers of bad blocks. As a result, the size of the super page can also be different across different zones. Based on the size of super pages in the zone that corresponds to the zone identification, a super page offset can be determined by finding a remainder from dividing the LBA offset by the size of super pages (e.g., similar to step 420 shown in FIG. 4).

Step 740 includes determining, by the address management module through accessing a cache memory, an FPA corresponding to the LBA based on the zone identification and LBA offset. For example, as shown in FIG. 5, a zone identification (e.g., zone0, zone1, etc.) and an LBA offset (e.g., LBA offset 0, LBA offset 1, etc.) can identify an FPA in mapping table 500. In some embodiments, the cache memory is similar to cache 124 or DDR 125 shown in FIG. 1. In some embodiments, the address management module can determine a plurality of FPAs in parallel.

Step 750 includes determining, by the address management module, a page number and a block identification corresponding to the FPA. In some embodiments, the page number and the block identification are used to execute the read command by accessing data stored at a page from the plurality of pages corresponding to the page number in a block from the plurality of blocks corresponding to the block identification. In some embodiments, the address management module can process a plurality of FPAs in parallel.

Step 760 includes fetching, by the SSD controller, data corresponding to the LBA from the flash memory based on the page number and the block identification. In some embodiments, the memory controller is an open-channel controller for the flash memory.

Embodiments of this specification provide methods and systems for establishing and utilizing a mapping table that translates LBAs to FPAs using zones and offsets. By using the mapping table, existence of bad blocks in super blocks can be accounted for, and physical addresses can be obtained efficiently without tedious calculations on the CPUs. The CPUs can be spared from performing mapping table lookups, resulting in a higher throughput for executing read operations on flash memories. Moreover, since the mapping table can be generated each time a NAND flash is powered up or becomes available to a host, the hardware system can be flexible in working with different types of NAND flash drives and NAND flash drives having different distributions of bad blocks.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system, comprising:
    a host,
    a memory controller communicatively coupled with the host, and
    a flash memory communicatively coupled to the memory controller, the flash memory comprises a plurality of blocks grouped into a plurality of super blocks, and each of the plurality of blocks including a plurality of pages,
    wherein the memory controller comprises:
        a flash translation layer configured to:
            receive a read command on the flash memory from the host, wherein the read command comprises a logic block address (LBA), and
            determine, based on the LBA, a zone identification and an LBA offset;
        a random access memory (RAM) configured to store a mapping table, wherein the mapping table includes a plurality of flash physical addresses (FPAs) arranged in a plurality of zones corresponding to the plurality of super blocks; and
        an address management circuitry configured to:
            receive the zone identification and the LBA offset from the flash translation layer,
            determine that a block with a block index corresponding to the LBA offset is a bad block,
            store information of the bad block in the RAM of the memory controller,
            iteratively move the block index until finding a good block,
            determine a physical address without page information in the good block corresponding to the LBA by accessing the mapping table stored in the RAM according to the zone identification and the LBA offset, and
            determine a page number based on the LBA and a number of FPAs within a single page, wherein the page number and the physical address are used to execute the read command by accessing data stored at a page from the plurality of pages corresponding to the page number in a block from the plurality of blocks corresponding to the physical address.

2. The system of claim 1, wherein the address management circuitry is implemented on a field programmable gate array (FPGA) or an application-specific integrated circuit (ASIC).

3. The system of claim 1, wherein the flash memory includes solid state drives (SSDs).

4. The system of claim 1, wherein the mapping table is generated and stored in the RAM in response to the flash memory being powered up.

5. The system of claim 1, wherein the RAM is one or more double data rate (DDR) synchronous dynamic random access memory (SDRAM).

6. The system of claim 1, wherein the address management circuitry is further configured to determine, in parallel, a plurality of FPAs corresponding to a plurality of LBA offsets.

7. The system of claim 1, wherein the memory controller is an open-channel controller for the flash memory.

8. A computer-implemented method, comprising:
    receiving, by a flash translation layer in a memory controller, a read command on a flash memory from a host, wherein the read command comprises a logic block address (LBA), the flash memory comprises a plurality of blocks grouped into a plurality of super blocks, and each of the plurality of blocks includes a plurality of pages;
    determining, by the flash translation layer, a zone identification and an LBA offset based on the LBA;
    determining, by the memory controller, that a block with a block index corresponding to the LBA offset is a bad block;
    storing, by the memory controller, information of the bad block in a random access memory (RAM) of the memory controller;
    iteratively moving, by the memory controller, the block index until finding a good block;
    determining, by an address management circuitry of the memory controller, a physical address without page information in the good block corresponding to the LBA by accessing a mapping table stored in the RAM according to the zone identification and the LBA offset, wherein the mapping table includes a plurality of flash physical address (FPA) arranged in a plurality of zones corresponding to the plurality of super blocks; and determining, by the address management circuitry, a page number based on the LBA and a number of FPAs within a single page, wherein the page number and the physical address are used to execute the read command by accessing data stored at a page from the plurality of pages corresponding to the page number in a block from the plurality of blocks corresponding to the physical address.

9. The method of claim 8, wherein the address management circuitry is implemented on a field programmable gate array (FPGA) or an application-specific integrated circuit (ASIC).

10. The method of claim 8, wherein the flash memory includes solid state drives (SSDs).

11. The method of claim 8, wherein the mapping table is generated and stored in the RAM in response to the flash memory being powered up.

12. The method of claim 8, wherein the RAM is one or more double data rate (DDR) synchronous dynamic random access memory (SDRAM).

13. The method of claim 8, further comprising:
determining, by the address management circuitry, a plurality of FPAs corresponding to a plurality of LBA offsets in parallel.

14. The method of claim 8, wherein the memory controller is an open-channel controller for the flash memory.

15. Non-transitory computer-readable storage media storing instructions that, when executed by one or more processors, cause the one or more processors to perform operations comprising:
receiving, by a flash translation layer in a memory controller, a read command on a flash memory from a host, wherein the read command comprises a logic block address (LBA), the flash memory comprises a plurality of blocks grouped into a plurality of super blocks, and each of the plurality of blocks includes a plurality of pages;

determining, by the flash translation layer, a zone identification and an LBA offset based on the LBA;

determining, by the memory controller, that a block with a block index corresponding to the LBA offset is a bad block;

storing, by the memory controller, information of the bad block in a random access memory (RAM) of the memory controller;

iteratively moving, by the memory controller, the block index until finding a good block;

determining, by an address management circuitry of the memory controller, a physical address without page information in the good block corresponding to the LBA by accessing a mapping table stored in the RAM according to the zone identification and the LBA offset, wherein the mapping table includes a plurality of flash physical address (FPA) arranged in a plurality of zones corresponding to the plurality of super blocks; and determining, by the address management circuitry, a page number based on the LBA and a number of FPAs within a single page, wherein the page number and the physical address block identification are used to execute the read command by accessing data stored at a page from the plurality of pages corresponding to the page number in a block from the plurality of blocks corresponding to the physical address.

16. The non-transitory computer-readable storage media of claim 15, wherein the address management circuitry is implemented on a field programmable gate array (FPGA) or an application-specific integrated circuit (ASIC).

17. The non-transitory computer-readable storage media of claim 15, wherein the mapping table is generated and stored in the RAM in response to the flash memory being powered up.

18. The non-transitory computer-readable storage media of claim 15, wherein the operations further comprise:
determining, by the address management circuitry, a plurality of FPAs corresponding to a plurality of LBA offsets in parallel.

* * * * *

UNITED STATES PATENT AND TRADEMARK OFFICE
CERTIFICATE OF CORRECTION

PATENT NO. : 12,277,341 B2
APPLICATION NO. : 18/172761
DATED : April 15, 2025
INVENTOR(S) : Xiang Gao et al.

Page 1 of 1

It is certified that error appears in the above-identified patent and that said Letters Patent is hereby corrected as shown below:

In the Claims

Claim 15, Column 16, Line 21:
"the physical address block identification are used to execute the read command" should read -- the physical address are used to execute the read command --.

Signed and Sealed this
Twenty-seventh Day of May, 2025

Coke Morgan Stewart
*Acting Director of the United States Patent and Trademark Office*